(No Model.)

I. P. CORNOG.
PATTERN CHAIN FOR LOOMS.

No. 361,616. Patented Apr. 19, 1887.

Attest:
E. M. Breckinridge
J. Maguire

Inventor
Isaac P. Cornog
By his atty

UNITED STATES PATENT OFFICE.

ISAAC P. CORNOG, OF PHILADELPHIA, PENNSYLVANIA.

PATTERN-CHAIN FOR LOOMS.

SPECIFICATION forming part of Letters Patent No. 361,616, dated April 19, 1887.

Application filed November 11, 1885. Serial No. 182,407. (No model.)

*To all whom it may concern:*

Be it known that I, ISAAC P. CORNOG, of the city and county of Philadelphia, and State of Pennsylvania, have invented an Improvement in Pattern-Chains for Looms, of which the following is a specification.

My invention has reference to an improvement in pattern-chains for looms, but more specifically to the method of hinging the links together; and it consists in certain improvements fully set forth in the following specification, and shown in the accompanying drawings, which form part thereof.

In loom-chains as heretofore constructed the links were hinged together by a long screw having a countersunk head on one end and having the other end screw-threaded and adapted to screw into one side of the link-connections. This construction is not only more or less expensive, but the screws are liable to work out and catch upon adjacent chains, causing defective working of the loom, when least expected.

The object of my invention is to dispense with all screws in the hinged connection and provide a suitable pin so constructed that it is retained in position after once being inserted and cannot be worked out in any position which the links might assume in the normal working of the chain.

Figure 1:
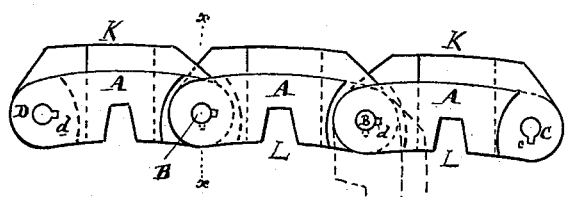
Figure 3:
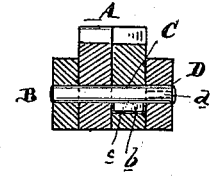
Figure 2:
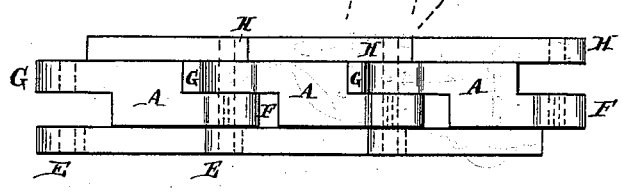
Figure 4:
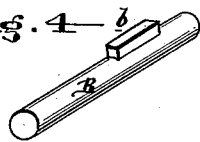
Figure 5:
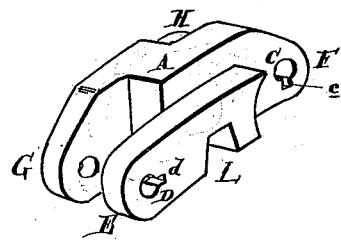
Figure 6:
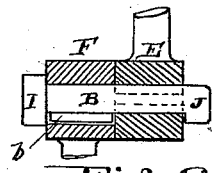

In the drawings, Figure 1 is a side elevation of a pattern-chain for looms embodying my invention. Fig. 2 is a plan view of same. Fig. 3 is a cross section of same on line *x x* of Fig. 1. Fig. 4 is a perspective view of one of the hinge-pins. Fig. 5 is a perspective view of one of the loom-chain links, and Fig. 6 is a sectional elevation showing a modified construction of a hinge-pin.

A represents the links, which are formed in the usual manner with the lugs E G and H F, which are so formed that the rear end of one link fits into the forward end of the next, and the links are hinged by the pin shown in Fig. 4, which is provided with the feather or key *b*, having its shoulders or ends square, which fits in the keyway *c*, whereby the feather *b* catches between the hinge-extensions E G of the links, and is thus retained in place, and the notch or groove *c* in the hole C of extension F prevents rotation of the pin B, so that its feather *b* can never come in line with the notch or groove *d* in the hole D, as said notch is at an angle of forty-five degrees with the notch *c* when the chain is in its normal working position. These grooves *c* and *d* extend through the parts E and F. To insert these hinge-pins the links are turned to the position indicated in dotted lines, Fig. 1, whereupon both notches *c* and *d* come in line, and the feather *b* on the pin can be pushed in beyond the extension E, and then, upon straightening the chain, the pin is locked in position. This form of hinge is also applicable to any other form of device where two parts are to be hinged together. In the form shown in Fig. 1 the feather is held between the two extensions E and G of the next link; but in the form shown in Fig. 6 there are simply two extensions, F E, hinged together, in which case it would be necessary to provide the pin B with a head, I, on one end and a second feather, J, on the other end, to prevent separation of the parts E F; but this is a construction that would not often be used. These links A have transverse notches L on their under parts, to insure the propulsion of the chain over the toothed or sprocket wheel, and their upper surfaces are provided with cam-faces K, made zigzag, with their ends tapered off. This allows the cam-faces to have a continued action over the greater part of the length of the link, and yet admits of their being properly and closely coupled together by means of the above-specified hinge-joint.

I am aware that it has been proposed to make a detachable open-center-link machine-chain in which the links are hinged by a pin having a tapering feather which fits into a corresponding taper notch; but to use such a device it becomes necessary to insert the pin always with the point of the feather first. I therefore do not claim such a construction.

Having now described my invention, what I claim as new, and desire to secure by Letters Patent, is—

The combination, with the links or parts to be hinged, said parts being respectively provided with the hinge-extensions E, G, and F and the zigzag cam portions K upon their faces and between their hinge-points, the parts E and G on one link receiving the part F on the next, and the parts E and F having their holes D and C provided with notches *d c*, extending entirely through them and arranged so as not to coincide when in normal position for working, but which may be abnormally turned so as to coincide, of the hinge-pins B, having the key or feather *b* formed thereon, of a length equal to the thickness of hinge-piece F, and made with square shoulders or ends, but removed somewhat from each end of the pin, substantially as and for the purpose specified.

In testimony of which invention I hereunto set my hand.

ISAAC P. CORNOG.

Witnesses:
R. M. HUNTER,
FRANCIS S. BROWN.